US006924801B1

(12) United States Patent
Dorbie

(10) Patent No.: US 6,924,801 B1
(45) Date of Patent: Aug. 2, 2005

(54) METHOD AND APPARATUS FOR EARLY CULLING OF OCCLUDED OBJECTS

(75) Inventor: Angus Dorbie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/247,816

(22) Filed: Feb. 9, 1999

(51) Int. Cl.[7] .............................................. G06T 15/40
(52) U.S. Cl. ...................................................... 345/422
(58) Field of Search ............................... 345/422, 424, 345/435, 425, 428, 629

(56) References Cited

U.S. PATENT DOCUMENTS

| | | | | |
|---|---|---|---|---|
| 5,008,838 A | * | 4/1991 | Kelleher et al. ............. 364/522 |
| 5,522,018 A | * | 5/1996 | Takeda et al. ............... 345/422 |
| 5,596,686 A | * | 1/1997 | Dukuk, Jr. ................... 345/422 |
| 5,600,763 A | * | 2/1997 | Greene et al. ............... 345/420 |
| 5,729,672 A | * | 3/1998 | Ashton ......................... 345/426 |
| 5,953,014 A | * | 9/1999 | Wood ........................... 345/422 |
| 5,977,980 A | * | 11/1999 | Aleksicy ...................... 345/422 |
| 6,091,422 A | * | 7/2000 | Ouaknine et al. ............ 345/419 |
| 6,091,428 A | * | 7/2000 | Piazza et al. ................ 345/509 |
| 6,246,415 B1 | * | 6/2001 | Grossman et al. ........... 345/422 |
| 6,480,205 B1 | * | 11/2002 | Greene et al. ............... 345/631 |
| 6,674,430 B1 | * | 1/2004 | Kaufman et al. ............ 345/419 |

OTHER PUBLICATIONS

Ned Greene, et al., "Hierarchical Z-Buffer Visibility", Computer Graphics Proceedings, Annual Conference Series, SIGGRAPH 93, Anaheim, California, Aug. 1-6, 1993, pp. 231-238.

* cited by examiner

*Primary Examiner*—Don Wong
*Assistant Examiner*—Huedung X. Cao
(74) *Attorney, Agent, or Firm*—Woodcock Washburn LLP

(57) ABSTRACT

A method and apparatus for early occlusion culling are provided. For the method of the present invention, a host processor establishes a coarse Z-buffer. The coarse Z-buffer is divided into a series of tiles. Each tile has an associated depth value. The depth values are updated using information fed back from the Z-buffer. The host processor uses the depth values to selectively discard occluded objects before they are rendered.

16 Claims, 3 Drawing Sheets

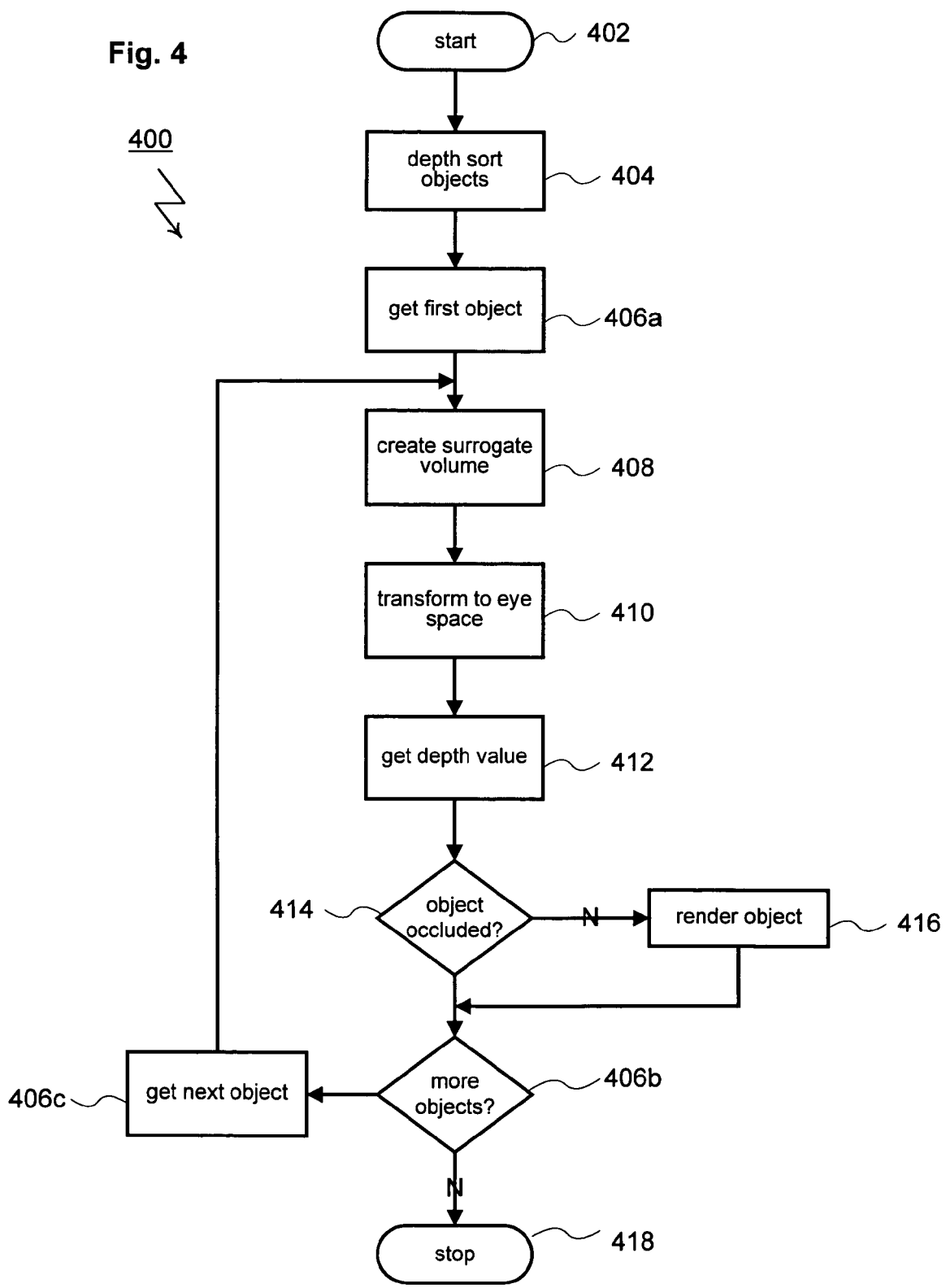

METHOD AND APPARATUS FOR EARLY CULLING OF OCCLUDED OBJECTS

FIELD OF THE INVENTION

The present invention relates generally to systems for computer graphics. More specifically, the present invention includes a method and apparatus for increasing graphics throughput by early elimination of occluded objects.

BACKGROUND OF THE INVENTION

Computer systems (and related devices) typically create three-dimensional images using a sequence of stages known as a graphics pipeline. During early pipeline stages, images are modeled using a mosaic-like approach where each object is composed of a collection of individual points, lines and polygons. These points, lines and polygons are known as primitives and a single image may require thousands, or even millions, of primitives. Each primitive is defined in terms of its shape and location as well as other attributes, such as color and texture.

The graphics pipeline maps, or renders, each primitive into a memory storage device known as a frame buffer. Each storage location within the frame buffer defines one pixel within the image being produced. The graphics pipeline performs the rendering process by determining which pixels (i.e., which frame buffer storage locations) are included within each primitive. Each pixel is then initialized to reflect the attributes of the primitive, or primitives in which it is included. In many cases, the graphics pipeline will further modify the pixel values in the frame buffer to apply texture, lighting and other effects to the graphics primitives.

The task of rendering primitives to pixels can be very time consuming. This is especially true for complex images that include many primitives or require complex lighting, shading or other effects. The time consumed transforming primitives becomes problematic for applications, such as flight simulators and virtual reality environments, where rapid image generation is required.

Occlusion culling methods attempt to improve the speed of the rendering process. For methods of this type, the rendering process is modified to take advantage of the fact that images often contain overlapping objects. This overlap means that some of the objects within an image may be fully or partially hidden or occluded. Occlusion culling methods detect occluded objects and eliminate them from all or part of the rendering process. In theory, this decreases the complexity of the rendering task and improves graphics throughput.

For maximum effectiveness, it is generally desirable to perform occlusion culling during the early stages of a graphics pipeline. Early occlusion culling maximizes the number of pipeline stages that benefit from the culling process. For this reason, many traditional occlusion culling methods, which only operate during the final pipeline stages, are far less than optimal. Unfortunately, traditional methods for early detection of occluded objects are often quite slow. As a result, the time gained by occlusion culling is often overshadowed by the time spent performing the culling process.

For these reasons, there is a need for improved occlusion culling methods. Preferably, methods of this type should be applicable to the early stages within a graphics pipeline. Methods of this type must operate quickly and ensure that time gained during the rendering process is not lost during the occlusion culling process.

SUMMARY OF THE INVENTION

The present invention provides a method and apparatus for early occlusion culling. For the present invention, the screen is divided into a series of tiles arranged as a rectangular grid. The rectangular grid is known as a coarse Z-buffer and may have various sizes and dimensions. For the purposes of this description, a size of two-hundred and fifty-six tiles arranged in a sixteen by sixteen grid may be assumed. Each tile within the coarse Z-buffer has an associated depth value. Each tile's depth value is defined as the farthest Z-buffer value that is included within that tile.

The graphics pipeline is configured to update the depth values using information fed back from the Z-buffer. To maximize the effectiveness of the occlusion culling method, the graphics pipeline may be configured to perform these updates on a synchronous basis. This means that the depth values are updated each time the corresponding Z-values in the Z-buffer are changed. The graphics pipeline may also be configured to perform these updates on a less frequent, asynchronous basis. Asynchronous updating provides a balanced approach that retains most of the benefit of the occlusion culling method while reducing the amount of data that must be fed back from the Z-buffer.

The depth values are stored in a location, such as main memory, where they are available to application programs. This allows application programs to reference these values while they are creating graphics images. The program rendering an image constructs a surrogate volume for each object that it adds to the image. The program then compares the nearest Z-value of the surrogate volume to the depth value of the tile that includes the surrogate volume. Based on this comparison, the application program determines if the object is occluded and can be discarded.

In some cases, a surrogate volume may span several tiles. In these cases the application program may determine if the object is occluded by performing comparisons with depth values for each of the spanning tiles. Alternately, it is possible to provide a series of coarse Z-buffers, each containing depth values for a different resolution. In such an arrangement, even large surrogate volumes may be analyzed using a single comparison.

It is important to note that the testing of surrogate volumes and the discarding of occluded objects is performed by the application program, executing on the host processor. The application program performs this test for each object before the object is sent to the graphics processor. As a result, objects that are found to be occluded never reach the graphics processor. The graphics processor is freed from any processing associated with these objects.

Advantages of the invention will be set forth, in part, in the description that follows and, in part, will be understood by those skilled in the art from the description herein. The advantages of the invention will be realized and attained by means of the elements and combinations particularly pointed out in the appended claims and their equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 4 is a flowchart showing the steps associated with an embodiment of the occlusion culling method of the present invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Environment

Figure 1:
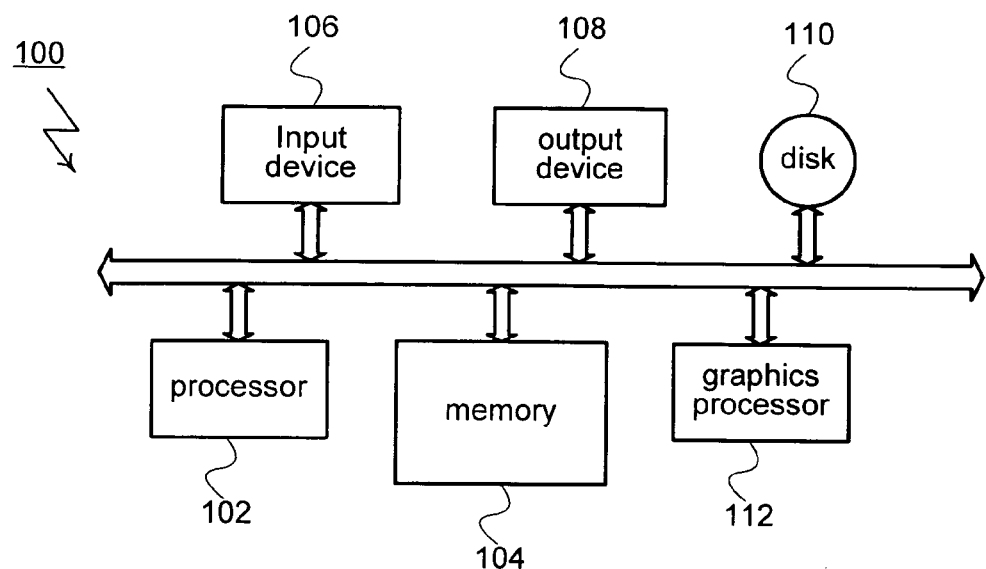
FIG. 1 is a block diagram of a computer system shown as a representative environment for the present invention.

In FIG. 1, a computer system 100 is shown as a representative environment for the present invention. Structurally, computer system 100 includes a host processor 102 and a memory 104. An input device 106 and an output device 108 are connected to host processor 102 and memory 104. Input device 106 and output device 108 are connected to host processor 102 and memory 104. Input device 106 and output device 108 represent a wide range of varying I/O devices such as disk drives, keyboards, modems, network adapters, printers and displays. Each node 102 may also include a disk drive 110 of any suitable type (equivalently, disk drive 110 may be any non-volatile mass storage system such as "flash" memory). Computer system 100 also preferably includes a graphics processor 112 of any suitable type. Graphics processor 112 implements all of the tasks required to translate graphics primitives and attributes to displayable output. In FIG. 1, host processor 102 and graphics processor 112 are interconnected using a bus. It should be appreciated that the present invention is equally suitable to environments where host processor 102 and graphics processor 112 share a commonly addressable memory.

Computer system 100 is the hose for a graphics pipeline. An implementation for this pipeline is designated 200 in FIG. 2. Pipeline 200 includes generation stage 202, traversal stage 204, transformation stage 206, rasterization stage 208 and display stage 210. Generation stage 202 corresponds to the creation, acquisition, or modification of information to be displayed and organizing this information into application data structures. Traversal stage 204 corresponds to the traversal of the application data structures generated in the preceding stage, passing on the appropriate graphics data. Transformation stage 206 corresponds to the transformation of the graphics data from object-space coordinates into eye-space coordinates, performing requested lighting operations, clipping the transformed data in clip-space-, and projecting the resulting coordinates into window space. Rasterization stage 208 renders window space primitives (such as points, lines, and polygons) into a frame buffer. Per-vertex shading calculations, texture lookups and calculations, and per-pixel operations such as depth testing are performed in this stage. Display stage 210 scans the resulting pixels in the frame buffer, typically for display to a video monitor or other device.

Figure 2:
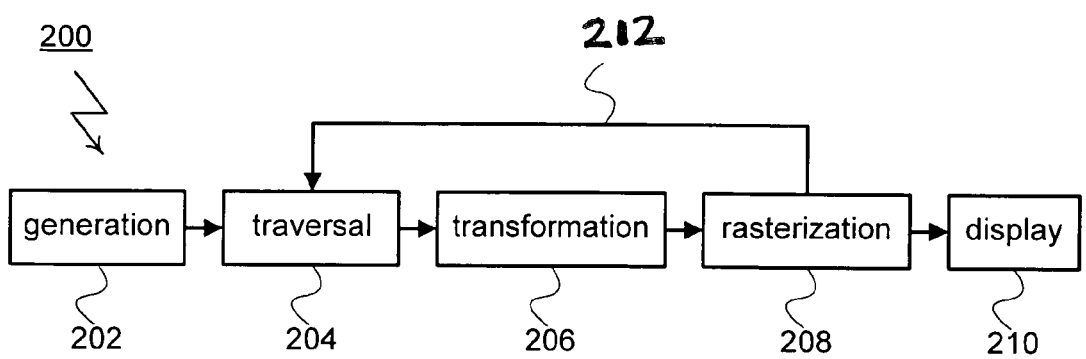
FIG. 2 is a block diagram of a graphics pipeline configured in accordance with an embodiment of the present invention.

In general, it should be appreciated that the particular sequence of stages shown in FIG. 2 is intended to be representative. Other combinations and orders are equally possible. For many embodiments, generation stage 202 and traversal stage 204 will be implemented by a graphics application program executing on host processor 102. The remaining stages would then be implemented directly by graphics processor 112.

As shown in FIG. 2, graphics pipeline 200 includes a Z-buffer feedback loop 212. As will be described in more detail, Z-buffer feedback loop 212 allows rasterization stage 208 to return information to traversal stage 204.

Early Occlusion Culling Technique

Figure 3:
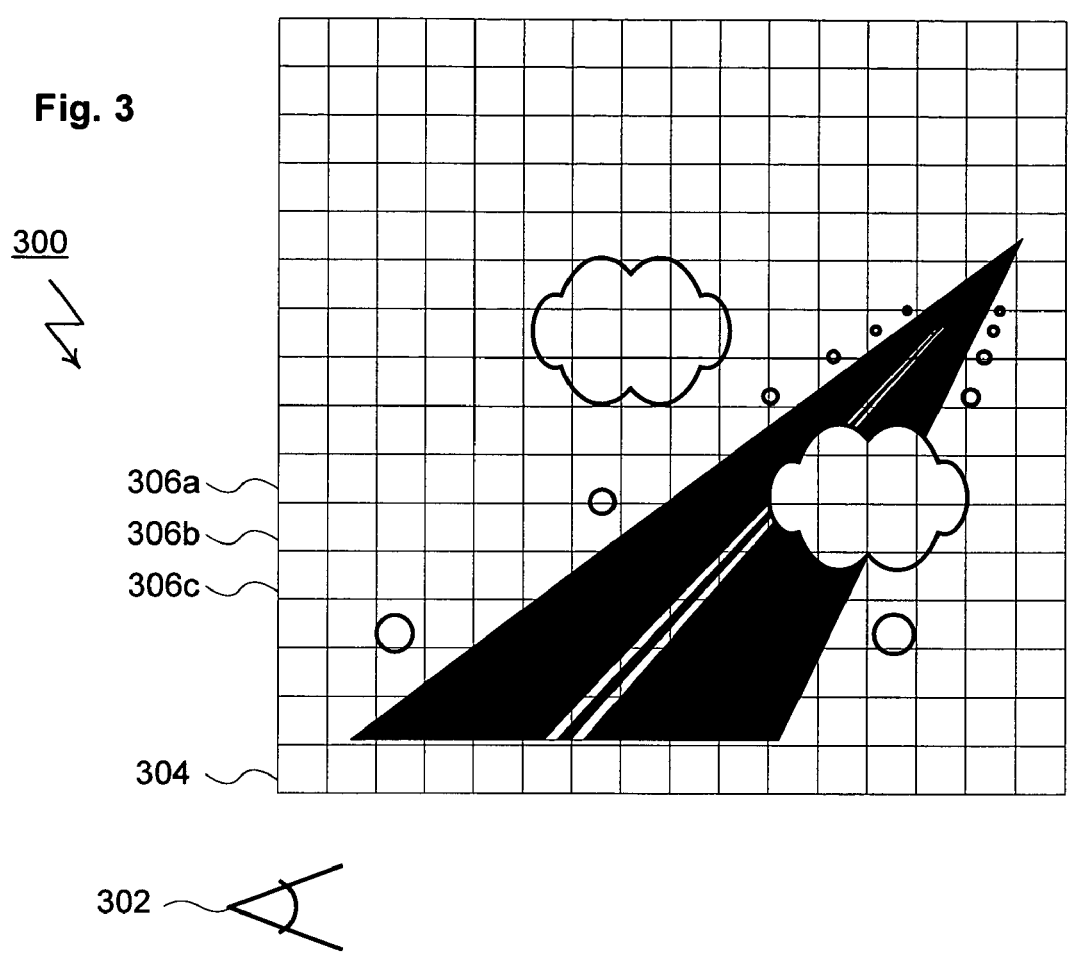
FIG. 3 is a block diagram of an embodiment of the coarse Z-buffer of the present invention.

The present invention provides a method and apparatus for early occlusion culling. The method and apparatus of the present invention are better understood by reference to representative image 300 of FIG. 3. Image 300 depicts a runway partially obscured by clouds. Eye-point 302 represents the position at which image 300 is viewed. Eye-point 302 is intended to be movable in relation to image 300. This means that components of image 300, including the runway and clouds may be viewed from a range of positions.

For the purposes of the present invention, image 300 is logically divided into a coarse Z-buffer 304. Coarse Z-buffer 304 includes a series of tiles of which tiles 306a and 306b are representative. Tiles 306 are arranged in a rectangular grid or matrix and may have various sizes and dimensions. For the purposes of this description a size of two-hundred and fifty-six tiles 306 arranged in a sixteen by sixteen matrix may be assumed. Each tile 306 within coarse Z-buffer 304 has an associated depth value. The depth value of each tile 306 is defined as the farthest Z-buffer value that is included within that tile 306.

The depth values are stored in a location where they are available to host processor 102 and application programs. Typically, this means that the depth values are most conveniently stored in memory 104.

Graphics pipeline 200 is configured to update the depth values in memory 104. This means that, for the particular configuration shown, rasterization stage 208 uses feedback loop 212 to continuously update the depth values within memory 104. Different configurations may perform this update as either a "push" or "pull" operation. Thus, for some configurations, rasterization stage 208 will transfer (push) depth values to memory 104. In other configurations, another entity (such as traversal stage 204 or the graphics application program executing on host processor 102) will retrieve (pull) depth values from rasterization stage 208. The depth values may also be updated either synchronously or asynchronously. For synchronous updating, depth values are transferred to memory 104 as they change within rasterization stage 208. Typically this means that depth values are updated each time corresponding Z-values in a Z-buffer used by rasterization stage 208 are changed. Graphics pipeline 200 may also be configured to perform these updates on a less frequent, asynchronous basis. In many cases this means that graphics pipeline 200 will perform these updates on a periodic basis. In other cases, graphics pipeline 200 can be configured to perform updates whenever a predefined number of changes have taken place in the Z-buffer used by rasterization stage 208. Asynchronous updating provides a balanced approach that retains most of the benefits of the occlusion culling method while reducing the amount of data that must be fed back from the Z-buffer.

Use of coarse Z-buffer 304 and its associated depth values is better appreciated by reference to occlusion culling method 400 of FIG. 4. Method 400 begins, symbolically, with start placeholder 402. In the first real step of method 400, host processor 102 depth sorts all of the objects that are included in an image being rendered. To perform this step, host processor 102 orders the objects, using a list or other data structure, so that the objects are arranged according to their distance from eye point 302. The ordering arranges the objects to be rendered so that closer objects (potential occluders) are processed before farther objects. In general, it should be appreciated that any number of sorting methods may be employed. In some cases, it will be more effective to employ quicker, less rigorous sorting methods. Methods of this type may be used to quickly order the objects so that obvious occluders are processed first.

Steps 406a, 406b and 406c form a loop. In this loop, host processor 102 processes all of the objects on the depth sorted list in order. Loop 406 is shown as an iterative loop, with the understanding that other control structures may also be used.

In step 408, host processor 102 generates a surrogate volume for the object being processed. The surrogate volume is a three-dimensional object, such as a sphere, that is just large enough to contain the object being processed.

In step 410, host processor 102 transforms the surrogate volume from object space to eye space. In most environments, the transformation to eye space may be accomplished quickly for sphere-shaped objects. For this reason, it is generally desirable to use sphere-shaped surrogate volumes.

In step 412, host processor 102 retrieves the depth value that corresponds to the surrogate volume generated in step 408. To perform this task, host processor 102 determines which tile 306 contains the surrogate volume. The retrieved depth value is the depth value associated with that tile 306. In some cases, a single surrogate volume will span two or more tiles 306. Host processor 102 may use several methods to select or generate a depth volume for a spanning surrogate volume. For one such method, host processor 102 selects the maximum value included in the set of depth values associated with the spanning surrogate volume. Host processor 102 then uses the selected depth value as the depth value for the spanning surrogate volume.

In step 414, host processor 102 determines if the object being processed may be occluded. Host processor 102 performs this task by comparing the depth value retrieved in step 412 to the nearest Z-value of the surrogate volume. In the case where a sphere is used as the surrogate volume, the nearest Z-value is generally calculated by subtracting the radius of the sphere from the Z-value of the sphere's origin. Similar methods may be used to calculate the nearest Z-value when other surrogate volumes are used.

If the nearest Z-value of the object is less than the depth value, the object may be visible and method 400 continues at step 416. In step 416, host processor 102 performs the steps required to render the object being processed. Typically, this means that host processor takes whatever steps are required to pass the object being processed to graphics processor 112. In other cases, host processor 102 may perform the rendering process itself.

If the nearest Z-value of the object is not less than depth value retrieved in step 412, the object is occluded and method 400 continues at step 406b. This causes method 400 to continue with another iteration of loop 406. In this way, method 400 continues until all of the objects in an image have either been eliminated, or rendered.

Method 400 may be extended to process objects in a hierarchical fashion. For this type of processing, objects that are not rejected as occluded (see steps 414 and 416) are subdivided into smaller objects. These smaller objects are then tested to determine if they are occluded. The hierarchical testing may be extended to an arbitrary number of levels.

Coarse Z-buffer 304 may be extended to include a series of levels. For this type of arrangement, coarse Z-buffer 304 is replicated one or more times. Each separate coarse Z-buffer 304 spans image 300 using a different resolution. For a representative embodiment, consider the case where a total of eight coarse Z-buffers 304 are used. Preferably, each of these coarse Z-buffers 304 would include the same number of tiles 306. Thus, to expand on the example of FIG. 3, eight coarse Z-buffer each including two-hundred and fifty-six tiles 306 would be used.

Each coarse Z-buffer 304 in a series spans the same image 300 at a different resolution. The highest resolution coarse Z-buffer 304 splits image 300 between tiles 306 with no overlap. This is the case shown for coarse Z-buffer 304 of FIG. 3. For lower resolution coarse Z-buffers 304, each tile 306 covers a larger area of image 300. Since the total number of tiles 306 remains constant, this means that tiles 306 within lower resolution Z-buffers 304 overlap each other. In fact, each succeeding lower resolution Z-buffer 304 includes successively larger tiles 306 that have successively larger overlapping areas.

Tiles 306 within successive coarse Z-buffers 304 may also be phase offset from tiles 306 within preceding coarse Z-buffers 304. This means that the center points of successive tiles 306 are offset from the center points of preceding tiles 306. The offset may be in both, or either of horizontal or vertical directions.

The hierarchical series of coarse Z-buffers 304 sums frame buffer Z information over progressively larger areas. This allows host processor 102 to select a resolution that corresponds to the size of any given object. In this way, a single comparison may be used to test surrogate volumes that would normally span two or more tiles 306. It should be noted that this representation is not a "MIP pyramid" which is very badly behaved when trying to find a convenient coarse Z region against which to test a large volume against some areas of the screen.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A system, used as a host for a graphics pipeline, comprising:
   a host processor executing a graphics application program, wherein the graphics application program is capable to implement:
      a generation stage for creation, acquisition, and modification of information to be displayed, and organizing the information into application data structures; and
      a traversal stage for traversal of the application data structures, and passing on appropriate graphics data; and
   a graphics processor, communicatively couples to the host processor, capable to implement:
      a transformation stage for transformation of graphics data from object space coordinates into eye-space coordinates, performing requested lighting operation, clipping the transformed data in clip-space, and projecting resulting coordinates into window-space;
      a rasterization stage for rendering window-space primitives into a frame buffer, and performing shading calculations, texture lookups and calculations, and per-pixel operations;

a feedback loop permitting the rasterization stage to return information to the traversal stage; and a display stage for scanning resulting pixels in frame buffer for display to a display device.

2. A method for early culling of occluded objects, comprising:
- a) ordering all objects, the objects being included in an image being rendered, according to their distance from eye point, comprising:
  - i) logically dividing area of the image into a coarse Z-buffer, the coarse Z-buffer including a series of tiles, the tiles being arranges in an rectangular grid, wherein the grid may have different resolutions, and wherein each tile has an associated depth value, the depth value being a Z-buffer value farthest from the eye that is included within that tile;
  - ii) constructing a surrogate volume for each object of the image, wherein each surrogate volume is a three-dimensional object that is just large enough to contain the object being ordered and wherein each surrogate volume may span only one tile of tan appropriate resolution;
  - iii) determining a depth value of the surrogate volume that is nearest the eye of the viewer;
  - iv) determining the depth value of the one tile that includes the surrogate volume;
  - v) comparing the depth value of the surrogate volume versus the depth value of the tile including the surrogate volume;
- b) culling the object whose surrogate volume has a depth value farther from the eye than the depth value of the tile, including the surrogate volume, after a single comparison; and
- c) rendering the objects whose surrogate volume has a depth value closer to the eye than the depth value of the tile, including the surrogate volume, or equidistant to the eye with the depth value of the tile including the surrogate volume.

3. The method of claim 2, wherein the surrogate volume may span several tiles and further comprising:
- comparing the depth value of the surrogate volume with each of the spanning tiles; and
- culling the objects whose surrogate volume has a depth value farther from the eye than the depth value of the tiles including the surrogate volume; and
- rendering the objects whose surrogate volume has a depth value closer to the eye than the depth value of at least one of the tiles including the surrogate volume or is equidistant to the eye with at least one of the tiles including the surrogate volume.

4. The method of claim 2, further comprising:
- subdividing the objects that are not occluded into smaller objects; and
- determining if the smaller objects are occluded.

5. A method for early culling of occluded objects, comprising:
- a) ordering all objects, the objects being included in an image being rendered, according to their distance from eye point, comprising:
  - i) logically dividing area of the image into a coarse Z-buffer, the coarse Z-buffer including a series of tiles, the tiles being arranges in an rectangular grid, wherein the grid may have different resolutions, and wherein each tile has an associated depth value, the depth value being a Z-buffer value farthest from the eye that is included within that tile;
  - ii) constructing a surrogate volume for each object of the image, wherein each surrogate volume is a three-dimensional object that is just large enough to contain the object being ordered and wherein each surrogate volume may span only one tile of an appropriate resolution;
  - iii) determining a depth value of the surrogate volume that is nearest the eye of the viewer;
  - iv) determining the depth value of the one tile that includes the surrogate volume;
  - v) comparing the depth value of the surrogate volume versus the depth value of the tile including the surrogate volume;
- b) culling the object whose surrogate volume has a depth value farther from the eye than the depth value of the tile, including the surrogate volume, after a single comparison; and
- c) rendering the objects whose surrogate volume has a depth value closer to the eye than the depth value of the tile, including the surrogate volume, or equidistant to the eye with the depth value of the tile including the surrogate volume;
- wherein each coarse Z-buffer is replicated one or more times at different resolutions, each separate coarse Z-buffer spans the image using a different resolution, the number of tiles in the coarse Z-buffers of various resolutions remains constant, for lower resolution coarse Z-buffers, each tile covers a larger area of the image, for lower resolution coarse Z-buffers, the tiles overlap one another,
- center points of successive resolutions of tiles of the coarse Z-buffers are offset from the center points of preceding resolution of tiles,
- lower resolution of the coarse Z-buffers split the image between tiles with overlap, a higher resolution coarse Z-buffer splits the image between tiles with no overlap, and a host processor is allowed to select a resolution that corresponds to a size of any given object.

6. A system comprising:
a memory for storing depth values, wherein the depth values are derived by:
- a) ordering all objects, the objects being included in an image being rendered, according to their distance from eye point, comprising:
  - i) logically dividing area of the image into a coarse Z-buffer, the coarse Z-buffer including a series of tiles, the tiles being arranged in a rectangular grid, wherein the grid may have different resolutions, and wherein each tile has an associated depth value, the depth value being a Z-buffer value farthest from the eye that is included within that tile;
  - ii) constructing a surrogate volume for each object of the image, wherein each surrogate volume is a three-dimensional object that is just large enough to contain the object being ordered and wherein each surrogate volume may span only one tile of an appropriate resolution;
  - iii) determining a depth value of the surrogate volume that is nearest to eye of a viewer;
  - iv) determining a depth value of the one tile that includes the surrogate volume;
a host processor for:
- determining which objects are occluded by comparing the depth value of the surrogate volume versus the depth value of the tile including the surrogate volume, generating the surrogate volumes for the objects being processed, and transforming the surrogate volumes from object space to eye space; and a graphics processor for rendering objects that are not occluded.

7. The method of claim 5, wherein the surrogate volume may span several tiles and further comprising:
comparing the depth value of the surrogate volume with each of the spanning tiles; and
culling the objects whose surrogate volume has a depth value farther from the eye than the depth value of the tiles including the surrogate volume; and
rendering the objects whose surrogate volume has a depth value closer to the eye than the depth value of at least one of the tiles including the surrogate volume or is equidistant to the eye with at least one of the tiles including the surrogate volume.

8. The method of claim 5, further comprising:
subdividing the objects that are not occluded into smaller objects; and
determining if the smaller objects are occluded.

9. A system comprising:
a memory for storing depth values, wherein the depth values are derived by:
a) ordering all objects, the objects being included in an image being rendered, according to their distance from eye point, comprising:
i) logically dividing area of the image into a first coarse Z-buffer and a second coarse Z-buffer, the first coarse Z-buffer and a second coarse Z-buffer each including a series of tiles, the tiles being arranged in a rectangular grid, wherein the grid of the first coarse Z-buffer and the second Z-buffer have different resolutions, wherein each tile has an associated depth value, the depth value being a Z-buffer value farthest from the eye that is included within that tile, and wherein center points of tiles of the first coarse Z-buffer and center points of tiles of the second Z-buffer resolution are offset from each other;
ii) constructing a surrogate volume for each object of the image, wherein each surrogate volume is a three-dimensional object that is just large enough to contain the object being ordered and wherein each surrogate volume may span only one tile of an appropriate resolution;
iii) determining a depth value of the surrogate volume that is nearest to eye of a viewer;
iv) determining a depth value of the one tile that includes the surrogate volume;
a host processor for:
determining which objects are occluded by comparing the depth value of the surrogate volume versus the depth value of the tile including the surrogate volume,
generating the surrogate volumes for the objects being processed, and transforming the surrogate volumes from object space to eye space; and a graphics processor for rendering objects that are not occluded.

10. The system of claim 9, wherein a second coarse Z-buffer resolution is greater than a first coarse Z-buffer resolution, whereby tiles in the first coarse Z-buffer cover a larger area of an image than tiles of the second coarse Z-buffer.

11. The system of claim 9, wherein a host processor selects a resolution for each coarse Z-buffer that corresponds to a size of any given object.

12. A method for culling occluded objects from an image being rendered into a frame buffer, the method comprising:
constructing at least two coarse Z-buffers, each Z-buffer covering the same image wherein a first coarse Z-buffer has a higher resolution than a second coarse Z-buffer, each coarse Z-buffer subdivided into a series of tiles, each tile having an associated depth value;
and center points of tiles of the first coarse Z-buffer having an offset from the center points of tiles of the second coarse Z-buffer;
updating the depth values of each of the coarse Z-buffers using Z information from the frame buffer; and
using the depth values to selectively discard the occluded objects from the image being rendered by constructing a surrogate volume for an object and retrieving a greatest depth value from the depth values set of tiles that are spanned by the surrogate volume, and comparing the nearest Z-value of the surrogate volume to the retrieved depth value;
wherein a host processor selects different resolutions for coarse Z-buffers that corresponds to a size of a given image.

13. A computer-readable medium having computer-executable instructions for performing a method for culling occluded objects from an image being rendered into a frame buffer, the method comprising:
constructing at least two coarse Z-buffers, each Z-buffer covering the same image wherein a first coarse Z-buffer has a higher resolution than a second coarse Z-buffer, each coarse Z-buffer subdivided into a series of tiles, each tile having an associated depth value;
applying means for determining differing Z-buffer resolutions and offsetting center points of tiles of the first coarse Z-buffer from the center point of tiles of the second coarse Z-buffer;
updating the depth values of each of the coarse Z-buffers using Z information from the frame buffer; and
using the depth values to selectively discard the occluded objects from the image being rendered by constructing a surrogate volume for an object and retrieving a greatest depth value from the depth values set of tiles that are spanned by the surrogate volume, and comparing the nearest Z-value of the surrogate volume to the retrieved depth value;
wherein a host processor selects different resolutions for coarse Z-buffers that corresponds to a size of a given image.

14. A computer-readable medium having computer-executable instructions for performing a method for culling occluded objects from an image being rendered into a frame buffer, the method comprising:
a) ordering all objects, the objects being included in an image being rendered, according to their distance from eye point, comprising:
i) logically dividing area of the image into a coarse Z-buffer, the coarse Z-buffer including a series of tiles, the tiles being arranged in a rectangular grid, wherein the grid may have different resolutions, and wherein each tile has an associated depth value, the depth value being a Z-buffer value farthest from the eye that is included within that tile;
ii) constructing a surrogate volume for each object of the image, wherein each surrogate volume is a three-dimensional object that is just large enough to contain the object being ordered and wherein each surrogate volume may span only one tile of an appropriate resolution;
iii) determining a depth value of the surrogate volume that is nearest the eye of the viewer;

iv) determining the depth value of the one tile that includes the surrogate volume;
v) comparing the depth value of the surrogate volume versus the depth value of the tile including the surrogate volume;

b) culling the object whose surrogate volume has a depth value farther from the eye than the depth value of the tile, including the surrogate volume, after a single comparison; and c) rendering the objects whose surrogate volume has a depth value closer to the eye than the depth value of the tile, including the surrogate volume, or equidistant to the eye with the depth value of the tile including the surrogate volume;

wherein each coarse Z-buffer is replicated one or more times at different resolutions, each separate coarse Z-buffer spans the image using a different resolution, the number of tiles in the coarse Z-buffers of various resolutions remains constant, for lower resolution coarse Z-buffers, each tile covers a larger area of the image, for lower resolution coarse Z-buffers, the tiles overlap one another, center points of successive resolutions of tiles of the coarse Z-buffers are offset from the center points of preceding resolution of tiles, lower resolution of the coarse Z-buffers split the image between tiles with overlap, a higher resolution coarse Z-buffer splits the image between tiles with no overlap, and a host processor is allowed to select a resolution that corresponds to a size of any given object.

15. The computer-readable medium of claim 14, wherein the step of constructing a surrogate volume comprises constructing a surrogate volume that spans several tiles and further comprises:

comparing the depth value of the surrogate volume with each of the spanning tiles; and culling the objects whose surrogate volume has a depth value farther from the eye than the depth value of the tiles including the surrogate volume; and rendering the objects whose surrogate volume has a depth value closer to the eye than the depth value of at least one of the tiles including the surrogate volume or is equidistant to the eye with at least one of the tiles including the surrogate volume.

16. The computer-readable medium of claim 14, further comprising:

subdividing the objects that are not occluded into smaller objects; and determining if the smaller objects are occluded.

* * * * *